3,524,718
PROCESSES FOR THE CONTINUOUS DYEING AND PRINTING OF CELLULOSE ESTER FIBER MATERIAL
József Nádor, Arlesheim, Switzerland, Hans-August Forsthoff, Lorrach, Baden, and Hans Rafael, Weil am Rhein, Baden, Germany, and Hans Wëgmuller, Riehen, and Willi Leutenegger, Bottmingen, Switzerland, assignors to J. R. Geigy A.G., Basel, Switzerland
No Drawing. Filed July 7, 1966, Ser. No. 563,398
Int. Cl. D06p 3/40, 5/04
U.S. Cl. 8—170                                    35 Claims

ABSTRACT OF THE DISCLOSURE

A process is provided for the continuous dyeing and printing of cellulose ester fiber material. According to the process there is applied to a cellulose ester fiber material a non-aqueous dyestuff solution comprising a mixture consisting essentially of (a) 50–99.5 percent by weight of unhalogenated or halogenated hydrocarbon having a boiling point between 70 and 150° C., and
(b) 50–0.5 percent by weight of water-miscible organic solvent having a boiling point below 210° C.,
(c) at least 0.1 percent by weight, calculated on the total weight of the dye liquor, of a non-ionogenic crocking-fastness improver and
(d) a dyestuff soluble in said mixture, of which dyestuff at least 0.5 gram is soluble in every kilogram of cellulose ester fibers, in a sufficient amount to impart to said material a desired color depth. Subsequently the resulting dyeing is fixed on the said fiber. Also provided are dye liquors used in the process as well as the fiber materials dyed or printed in accordance with the process.

---

The present invention concerns processes for the continuous dyeing and printing of fiber material made from cellulose ester, the dye liquors used therefor as well as fiber materials dyed or printed by these processes.

It has been a problem of long standing in the dyeing and printing industry to find continuous processes for dyeing and printing cellulose ester fiber materials in such a manner that, apart from impregnating and dye-fixing steps, no further after-treatment, be it with chemical agents or by rinsing with water, would be required.

Apart from the manifest economic advantages to be gained by a coloring process limited to the aforesaid two principal steps of treatment, there would be no need in such a process for disposing of large amounts of waste liquors and wash waters contaminated with noxious chemicals, the release of which into rivers and streams may lead to perilous water-pollution.

It is, therefore, a first object of this invention to provide processes of continuously coloring materials of cellulose ester fibers, which require only impregnation and fixation steps, but no after-treatment, especially not with aqueous media that would lead to the formation of aqueous waste liquids which are difficult to dispose of.

It is another aspect of the invention to provide coloring processes as defined hereinbefore which afford dyeings and prints on cellulose ester fiber materials which are of uniform fastness to crocking.

It is yet another object of the invention to provide coloring processes as defined hereinbefore, which afford dyeings and prints, on the said fibrous materials, the wet fastness properties and especially the fastness to perspiration, of which are at least as good as those of dyeings and prints obtained with the known methods of coloring such fibers with aqueous dye liquors or inks.

It is a further object of the invention to provide coloring processes as defined hereinbefore, which afford dyeings, on the said fibrous materials, which sustain modern dry cleaning methods without any significant deterioration.

It is a final, very important object of the invention to provide processes as defined above, which afford dyed cellulose ester fiber materials, having a pleasant, silk-like handle.

Such handle could not be attained by the known dyeing or printing methods which involve the use of aqueous dye liquors and pastes, for such treatment always destroys the characteristic silk-like handle, e.g. of undyed acetate rayon satin, and imparts to the cellulose ester fibers, a handle which can be readily distinguished by the consumer from the desired handle of silk satin.

It has been found that cellulose ester fiber material can be continuously dyed or printed, in a manner which meets most or all of the aforesaid objects, by (1) Impregnating or printing this material with a solution of at least one dyestuff and, optionally, a non-ionogenic auxiliary, in a mixture of solvents consisting of (a) about 50 to 99.5 percent by weight of optionally halogenated hydrocarbon having a boiling point of between 70 and 150° C., and
(b) the balance of a water-miscible organic solvent having a boiling point below 210° C., (2) Removing a substantial part of the excess dye liquor from the material, and
(3) Fixing the dyeing or printing by subjecting the treated fiber material to a heat treatment at temperatures below the softening point of the fibers.

Examples of suitable hydrocarbons having boiling points between 70 and 150° C. which can be used as component (a) of the mixture of solvents usable according to the invention are aromatic hydrocarbons such as toluene or xylene, especially, however, halogenated, particularly chlorinated, hydrocarbons, e.g. chlorobenzene or, preferably, lower aliphatic halogenohydrocarbons, in particular chlorinated hydrocarbons, e.g. carbon tetrachloride, trichloroethylene or tetrachloroethylene, tetrachloroethane, or dibromoethylene. Mixtures of such solvents can also be used as component (a) in the mixtures of solvents usable according to the invention.

Examples of water-miscible organic solvents (b) having boiling points below 210° C. in the mixtures of solvents to be used according to the invention are: monovalent aliphatic alcohols such as lower alkanols, e.g. methanol, ethanol n- or iso-propanol; alkylene glycol monoalkyl ethers such as ethylene glycol monomethyl monoethyl ether; furthermore, furfuryl alcohol, tetrahydrofurfuryl alcohol, dihydric aliphatic alcohols such as ethylene glycol or 1,2-propylene glycol; lower aliphatic ketones such as acetone; lower cyclic ethers such as dioxan; amides, especially lower alkyl amides, of lower fatty acids such as dimethyl formamide or dimethyl acetamide, carbonic acid amides, especially lower alkyl-substituted urea such as tetramethyl urea; or tertiary organic amines such as pyridine, as well as mixtures of said solvents. The amides of a lower fatty acid are preferred as component (b) of the mixtures of solvents according to the invention for reasons given further below.

The composition of the mixture of solvents depends on the solubility therein of the dyestuff or mixture of dyestuffs to be used and should be such as to yield a clear, homogeneous solution.

The term "lower" used in this specification and the appended claims in connection with an aliphatic radical or compound such as alkyl or alkanol means that such radical has not more than 5 carbon atoms.

It is well known that fastness to crocking is one of the particularly important fastness properties required by the trade for cellulosic ester materials, other fastness properties particularly required being wet fastness, especially fastness to perspiration. It is, of course, desirable that such wet fastness properties are at least about equally good when continuously dyeing or printing cellulosic ester materials according to the invention, as when dyeing or printing such materials with the hitherto known aqueous liquors or inks.

In a particularly preferred mode of carrying out the processes of the invention in practice, the dyeing or printing solutions described above must contain, apart from dyestuff and the above-defined components (a) and (b):

(c) A non-ionogenic crocking-fastness improver which is necessary to obtain in the dyed or printed cellulose ester materials the desired uniform fastness to rubbing, which, without the use of such fastness-improver, the material will show irregular patches of high fastness to rubbing intermingled with zones in which such fastness is missing, thus making the material unsuited for use as textile materials.

As non-ionogenic crocking fastness improvers present in the dye liquors or inks according to the invention, polyglycol ethers the lipophilic moiety of which consists of a higher aliphatic hydrocarbon radical having about 10 to 20 carbon atoms and the polyether chain of which consists of about 4 to 20 ethyleneoxy groups, have proved to be particularly valuable. A preferred class of such polyglycol ethers are condensation products of 1 mol of a higher fatty alcohol or a higher fatty acid with 4 to 10 mols of ethylene oxide, such as, e.g. dodecyl-, octadecyl- or octadecenyl-penta, hepta- or decaglycol ether or stearoly- or oleoyl-penta, -hepta- or -decaglycol ether; they possess good miscibility with at least one of the two main solvent components (a) and (b). Other non-ionogenic polyglycol ethers, e.g. those the lipophilic moiety of which consists of phenyl radicals substituted by higher alkyl groups such as nonylphenol pentaglycol ether or nonylphenol tri-(1,2-propylene) ether or polyglycol ethers containing basic nitrogen, for instance polyglycol ethers of aliphatic, higher alkylated or higher acylated di- and polyamines, also afford to a certain degree an improved uniformity in fastness to rubbing. Also amides of aliphatic monocarboxylic acids having at least one lipophilic radical with primary or secondary amines having at least one lower hydroxyalkyl group, preferably coconut fatty acid mono- or dihydroxyethyl amides, optionally admixed with the abovementioned polyglycol ethers, can be used.

However, optimal results of improved uniformity of fastness to crocking and, at the same time, unimpaired wet fastness, especially fastness to perspiration, have been obtained with oleoyl polyglycol ether having 4 to 10 ethyleneoxy groups.

Preferably 0.5 to 3 percent by weight of non-ionogenic crocking-fastness improver are used, calculated on the total weight of the dye liquor or printing ink.

Dyestuffs usable in the processes and in dye liquors and inks according to the invention, are, first of all, dispersion dyestuffs, more especially disperse dyestuffs free from water-solubilizing groups which dissociate acid in water, and, secondly, water-soluble dyestuffs and, thirdly, color salts.

Those dyestuffs are suitable for use in the processes according to the invention the affinity of which to cellulose ester fibers is sufficiently great, so that at least 0.5 gram thereof is dissolved in every kilogram of cellulose ester fibers.

Among the preferred dispersion dyestuffs, metal-free azo, styrene, naphthoperinone, quinophthalone, nitro and anthraquinone dyestuffs containing no acid salt-forming groups are particularly suitable.

Suitable dyestuffs can be metal-free or heavy metal-containing azo dyestuffs, in which are also included formazane dyestuffs, they can also be anthraquinone, nitro, methine, azamethine, styryl, azostyryl, naphthoperinone, quinonaphthalone, oxazine, 5-amino-8-hydroxy-1,4-naphthoquinone or phthalocyanine dyestuffs.

By water-soluble dyestuffs are meant in particular the so-called acid wool dyestuffs of the azo and anthraquinone series which contain a sulfonic acid or carboxylic acid group. Azo dyestuffs are metal-free or heavy metal-containing monoazo or disazo dyestuffs. Suitable heavy metal-containing azo dyestuffs are chromium or cobalt containing azo dyestuffs free from acid and basic water solubilizing groups which contain one metal atom bound to two molecules of monoazo dyestuff. 1-amino-4-arylamino-anthraquinone-2-sulfonic acids are mentioned in particular as anthraquinone dyestuffs.

Soluble color salts are mainly salts having an organic cation and inorganic or organic anion, that is both color salts having a colored cation and colorless anion as well as color salts having a colorless cation and colored anion and color salts having both a colored cation and anion.

The colored moiety of these color salts can be taken from any one of the above classes of dyestuffs. Preferred colored cations belong to, e.g. the di- and tri-phenylmethane, rhodamine, oxazine, thiazine series, or they are azo dyestuffs containing quaternary ammonium groups, particularly cyclammonium groups. The colored anions of such soluble color salts are, e.g. the ions of dyestuff carboxylic acids or, more advantageously, of dyestuff sulfonic acids or of metal complex dyestuffs which consist of one equivalent of trivalent, coordinative hexavalent heavy metal, chiefly chromium or cobalt and two equivalents of bicyclic metal complex-forming dyestuffs, e.g. of the class of o,o'-dihydroxy- or o-hydroxy-o'-carboxy azo or azomethine dyestuffs. As such color salts, e.g. precipitation products of di- or tri-phenylethane or rhodamine dyestuffs with optionally sulfonated chromium or cobalt complexes of o,o'-dihydroxy- or o-hydroxy-o'-carboxy azo dyestuffs can be used. Colorless cations in these salts are those of primary, secondary or tertiary organic amines of the aliphatic, cycloaliphatic, araliphatic, aromatic or heterocyclic series or of cyclic amines. As colorless anions in salts having colored cations, mainly the radicals of organic acids, particularly aromatic sulfonic acids, e.g. anions of alkyl-alkoxy-benzene sulfonic acids are suitable for the purposes of this invention.

The dyestuff solution to be used in the processes according to the invention preferably contains 0.1 to 10 percent by weight of one or more of the dyestuffs mentioned, depending on the depth of shade desired.

If necessary, the dye liquor can also contain thickeners, advantageously those which are soluble in the mixture of solvents as defined, such as thickeners based on cellulose esters, polyvinyl esters, butyl methacrylate type thickeners or chlorinated rubber.

Fiber materials made from cellulose esters are especially those from cellulose tri- and, particularly, -2½- acetate, which fibers can be dyed according to the processes of the invention in any form desired, e.g. in the form of flocks, slubbing, yarn, or, preferably, fabrics.

The cellulose ester fiber material is impregnated, e.g., by printing or spraying, preferably however, by pad dyeing. In the latter case, the fiber material is passed continuously through the dyestuff solution preferably at room temperature and then squeezed out to the desired content of impregnation liquor, which is about 30 to 150 percent by weight (calculated on the dry weight of the goods). The main part of the solvent remaining in the fibers is then removed under mild evaporating conditions at 40 to 80° C., advantageously with the aid of a stream of warm dry air.

The dyestuff is then fixed by a subsequent heat treatment of either still moist or optionally, the already dried fiber material, either by steaming at temperatures of about 100 to 103° C., or, preferably, by a dry heat treatment (the so-called thermofixing) at a temperature of at least 185° C. but below the softening point of the fiber material. For thermofixing, contact heat, a treatment with high frequency alternating currents or irradiation with infrared are particularly suitable. Preferably, however, the dyestuff is fixed on the fiber material in a hot air stream at 100 to 230° C., particularly at a temperature of 170 to 220° C.

The time during which the goods remain in the dyestuff solution, the drying of the impregnated goods and the duration and temperature of the dry heat treatment to fix the dyestuff on the fiber are dependent on the composition of the mixture of solvents. The conditions or operations mentioned should be so coordinated that the fiber is affected sufficiently for a satisfactory take-up of dyestuff but that its mechanical properties remain substantially unimpaired.

On using a dyestuff solution which contains, as mixture of solvents, e.g. 90 percent by weight of trichloroethylene and 10 percent by weight of methanol or 95 percent by weight of tetrachloroethylene and 5 percent by weight of dimethyl acetamide, the time during which the cellulose ester fiber material should remain in the dyestuff solution is preferably 1 to 4 seconds, the duration of thermofixing in an air stream of 170 to 220° C. is advantageously 10 to 120 seconds.

Dye liquors or inks according to the invention which enable sensitive cellulose-2½-acetate fabric to be dyed without impairing the mechanical properties of the fiber material while yielding dyeings on such material having soft handle and, especially, over-all improved and uniform fastness to rubbing independently of a particular zone of the continuously moved fibers which become subject to rubbing, consist, e.g., of a solution of (a) at least one unhalogenated or halogenated, hydrocarbon having a boiling point between 70 and 150° C., preferably a chlorinated lower aliphatic hydrocarbon, such as tetrachloroethylene or trichloroethylene, (b) at least one water-miscible organic solvent having a boiling point below 210° C., preferably an amide, alkyl or dialkyl amide of a lower fatty acid, particularly dimethyl acetamide, the weight ratio of $(b):(a)$ being in the range of from 1:200 to, at most, 1:9, (c) at least 0.1 percent by weight, calculated on the total weight of the dye liquor, of a non-ionogenic auxiliary, in particular, a polyglycol ether having a lipophilic radical, but preferably not more than is necessary to impart uniform fastness to crocking to all zones of the dyed or printed material, while not essentially impairing its wet fastness, particularly its fastness to perspiration, and (d) the dyestuff dissolved therein.

A particularly improved handle is attained by limiting the amount of component (b) used to about 3 to 5 percent by weight, calculated on the total weight of the dye liquor.

Fibers of, in particular, cellulose-2½-acetate can be dyed by the process according to the invention in very deep shades and it is surprising that the fibers retain their silky feel whilst on dyeing with the customary aqueous dye or foulard liquors, this characteristic feel is lost to a considerable extent. Another advantage of the new processes over the previously known dyeing methods is that, on using dispersion dyestuffs, the coarser grained dyestuffs as obtained by industrial methods can be used directly in the dyestuff solutions as defined, whereas dyeing from aqueous dispersions necessitates very finely distributed dyestuffs which have to be produced by protracted milling operations with suitable dispersing agents.

As, in the commercial performance of the process, the solvents used can be regained and used again for a subsequent dyeing process, in contrast to the known processes using aqueous baths, the problem of cleansing the waste liquids before their disposal does not arise. In addition, rinsing baths are no longer necessary, which is a further advantage.

Level, strongly colored dyeings which are fast to dry cleaning, crocking and perspiration, are obtained on the fiber materials mentioned by the processes according to the invention.

Dyestuff solutions and inks to be used in the processes according to the invention are conveniently prepared by dilution with component (a), of pre-concentrates consisting essentially of (i) from about 30% to about 80% of component (a),
(ii) correspondingly from about 65% to 8% of component (b),
(iii) at least about 5% up to preferably not more than 30%, optionally about 10 to 20%, of the crocking fastness improver (c), and
(iv) preferably about 5 to 10% of dyestuff, depending on the desired color strength of the dyeings or prints to be produced. All above percentages are by weight calculated on the total weight of the pre-condensate.

The weight ratio of component $(b):(a)$ in the pre-condensates should, therefore, range from about 1:2 to 1:10.

The following examples illustrates the invention further. Temperatures are given therein in degrees centigrade, "room temperature" meaning about 20 to 25° C. Percentages are given by weight unless expressly stated otherwise.

EXAMPLE 1

10 g. of dyestuff of the formula

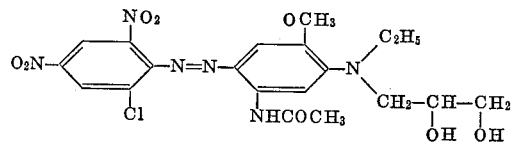

are dissolved in 1000 g. of a mixture of solvent consisting of 90 percent by weight of trichloroethylene and 10 percent by weight of methanol. The solution is then clarified. Fabric made from cellulose-2½-acetate is then impregnated at room temperature with this intensively blue coloured, clear dye solution, excess dye-liquor is squeezed out to 100% of the dry weight of the goods and the impregnated fabric is dried at 40–80° in an air stream. The dyeing is then thermofixed for 60 seconds at 180–210° by heat attained with infrared rays.

A strongly coloured, level and well developed blue dyeing is obtained which has good fastness to dry cleaning and perspiration.

If instead of the dyestuff mentioned in the example, one of those given in the following Table I column 2 is used and otherwise the procedure given in the example is followed, then strongly coloured, level and well developed dyeings are also obtained on cellulose-2½-acetate, the shades of which are given in column 3.

TABLE I

| Example No. | Dyestuff | Shade on cellulose-2½-acetate |
|---|---|---|
| 2 | $CH_3CONH-\langle\text{phenyl}\rangle-N=N-\langle\text{phenyl}(HO, CH_3)\rangle$ | Greenish yellow. |
| 3 | $O_2N-\langle\text{phenyl}\rangle-N=N-\langle\text{phenyl}(OCH_3, NH_2, CH_3)\rangle$ | Yellowish orange. |
| 4 | $O_2N-\langle\text{phenyl}\rangle-N=N-\langle\text{phenyl}(CH_3, NH_2)\rangle$ | Orange. |
| 5 | $O_2N-\langle\text{phenyl}\rangle-N=N-\langle\text{phenyl}(NH-COCH_3, NH_2)\rangle$ | Scarlet. |
| 6 | $O_2N-\langle\text{phenyl}(Cl)\rangle-N=N-\langle\text{phenyl}(CH_3)\rangle-N(CH_2CH_2OH)_2$ | Ruby. |
| 7 | $\langle\text{phenyl}\rangle-N=N-\langle\text{phenyl}\rangle-N=N-\langle\text{phenyl}(OH, CH_3)\rangle$ | Reddish yellow. |
| 8 | $\langle\text{phenyl}\rangle-NH-\langle\text{phenyl}(O_2N)\rangle-SO_2NH-\langle\text{phenyl}\rangle$ | Yellow. |
| 9 | $n-C_3H_7-CO-\langle\text{naphthyl}\rangle-CO-N\langle\text{benzimidazolyl-CH}_3\rangle$ | Greenish yellow. |
| 10 | $\langle\text{quinolinyl}(OH)\rangle-CH\langle\text{phenyl}(NO_2)(CO)(CO)\rangle$ | Yellow. |
| 11 | $HOCH_2CH_2\rangle N-\langle\text{phenyl}(CH_3)\rangle-CH=C(CN)_2$ with $C_2H_5$ | Greenish yellow. |
| 12 | Anthraquinone derivative with $HN$, $O$, $Br$, $Cl$, $Cl$, $Cl$, $NH$ | Blue. |

EXAMPLE 13

12 g. of dyestuff of the formula

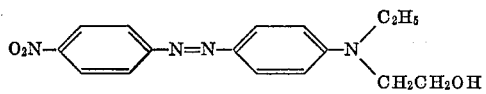

are dissolved in 1000 g. of a mixture of solvents which consists of 90 percent by weight of trichloroethylene and 10 percent by weight of methanol. Cellulose triacetate fabric is impregnated with this intensively red coloured, clarified dye solution and is dried as described in Example 1. (The fabric is squeezed out to about 50% liquor content.) The impregnated and dried fabric is then thermofixed for 90 seconds in a hot air stream at 220°.

A level and well developed scarlet dyeing is obtained which has good fastness to dry cleaning.

If in this example instead of 10 percent by weight of methanol the same amount of one of the water miscible solvents given in column 2 of the following Table II is used and otherwise the procedure given in the example is followed, then level and well developed scarlet dyeings are also obtained on cellulose triacetate fabric which have similarly good fastness to dry cleaning.

TABLE II

| Example No.: | Water miscible solvent |
|---|---|
| 14 | Ethanol. |
| 15 | Isopropanol. |
| 16 | n-Butanol. |
| 17 | Ethylene glycol monomethyl ether. |
| 18 | Tetrahydrofurfuryl alcohol. |
| 19 | Ethylene glycol. |
| 20 | 1,2-propylene glycol. |
| 21 | Dioxan. |
| 22 | Acetone. |
| 23 | Dimethyl formamide. |
| 24 | Pyridine. |

If in Examples 13–24, instead of 90 percent by weight of trichloroethylene, the same amount of one of the hydrocarbons or chlorinated hydrocarbons mentioned in column 2 of the following Table III is used and otherwise the same procedure as in this example is followed, then level and well developed scarlet dyeings are also obtained on cellulose triacetate fabric.

TABLE III

| Example No.: | Hydrocarbon or chlorinated hydrocarbon |
|---|---|
| 25 | Toluene. |
| 26 | Xylene. |
| 27 | Tetrachloroethylene. |
| 28 | Carbon tetrachloride. |

If in Examples 13 to 28, instead of cellulose triacetate, cellulose-2½-acetate is used, then with otherwise the same procedure as described, well developed and strongly coloured scarlet dyeings are also obtained on the fibres mentioned.

EXAMPLE 29

6 g. of dyestuff of the formula

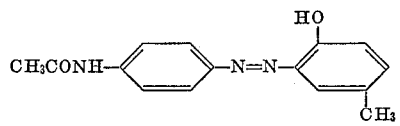

are dissolved in 1000 g. of a mixture of solvents which consists of 99 percent by weight of trichloroethylene and 1 percent by weight of dimethyl formamide and the solution is clarified. Cellulose-2½-acetate fabric is impregnated with this clear yellow solution and dried as described in Example 1. The fabric is then thermofixed for 90 seconds in a stream of hot air at 190°. A level and well developed yellow dyeing on the material mentioned is obtained.

Level and well developed yellow dyeings on the material mentioned are also obtained if the thermofixing is performed by treatment with high frequency alternating currents or by infra-red rays or by contact heat instead of a stream of hot air and otherwise the procedure given in the example is followed.

EXAMPLE 30

10 g. of the 1:2 chromium complex of the azo dyestuff of the formula

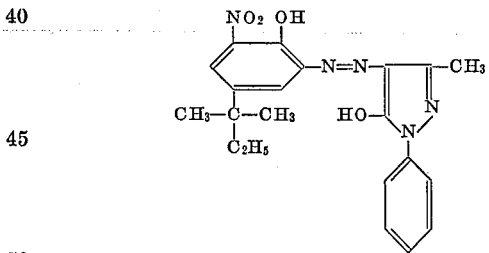

are dissolved in 1000 g. of a mixture of solvents which consists of 90 percent by weight of trichloroethylene and 10 percent by weight of methanol and the solution is clarified. Cellulose-2½-acetate is impregnated with this clear red dye solution and dried as described in Example 1. The fabric is then thermofixed in a stream of hot air for 90 seconds at 200°. A strongly coloured, level and well developed red dyeing is obtained which has good fastness to perspiration.

If, instead of trichloroethylene, the same amount of a mixture of trichloroethylene and xylene in a weight ratio of 1:1 or, instead of methanol, the same amount of a mixture of methanol and dimethyl formamide in a weight ratio of 9:1 is used then, with otherwise the same procedure as described in the example, similar results are obtained.

If instead of the dyestuff mentioned in this example, one of the dyestuffs given in column 2 of the following Table IV is used and otherwise the procedure given in the example is followed, then strongly coloured, level and well developed dyeings on cellulose-2½-acetate are also obtained. The shades of the dyeings are given in column 3.

TABLE IV

| Example No. | Dyestuff | Shade on cellulose-2½-acetate |
|---|---|---|
| 31 | 1:2 cobalt complex of the compound | Yellow-brown. |
| 32 | 1:2 chromium complex of the compound | Yellow. |
| 33 | 1:2 chromium complex of the compound | Brownish-red. |

If in Examples 30 to 33, instead of cellulose-2½-acetate, cellulose triacetate is used then, with otherwise the same procedure as given, well developed and strongly coloured dyeings are also obtained on the fibre material mentioned.

EXAMPLE 34

8 g. of dyestuff of the formula

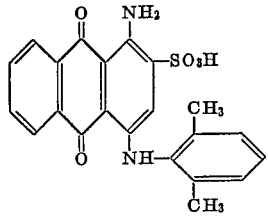

are dissolved in 1000 g. of a mixture of solvents which consists of 90 percent by weight of trichloroethylene and 10 percent by weight of dioxan and the solution is clarified. Cellulose-2½-acetate fabric is impregnated with this intensively blue coloured, clear dye solution as described in Example 1 and dried. The liquor content is about 80%. The impregnated and dried fabric is then thermofixed in a stream of hot air for 90 seconds at 200°.

A strongly coloured, level and well developed blue dyeing is obtained on the fibre material mentioned. It has good fastness to dry cleaning.

EXAMPLE 35

40 g. of dyestuff of the formula

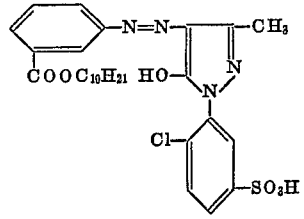

are dissolved in 1000 g. of a mixture of solvents which consists of 80 percent by weight of trichloroethylene and 20 percent by weight of methanol and the solution is clarified. Cellulose-2½-acetate fabric is impregnated with this clear yellow dye solution as described in Example 1 and then dried. The impregnated and dried fabric is then thermofixed in a stream of hot air for 60 seconds at 190°.

A strongly coloured, level and well developed yellow dyeing is obtained on the material mentioned.

EXAMPLE 36

10 g. of the colour salt of the formula

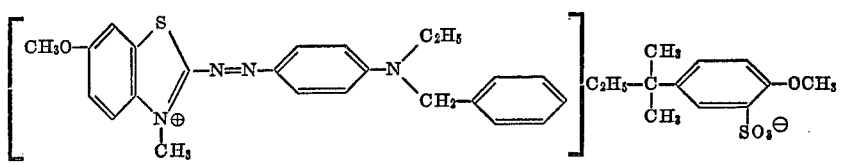

are dissolved in 100 g. of methanol and 900 g. of trichloroethylene are added and the solution obtained is clarified. Cellulose-2½-acetate fabric is impregnated with this clear, blue dye solution as described in Example 1 and then dried. The impregnated and dried fabric is then thermofixed in a hot air stream for 40 seconds at 180°.

A strongly coloured, level and well developed blue dyeing on the material mentioned is obtained.

EXAMPLE 37

10 g. of colour salt, obtained by precipitation from an aqueous solution of the sodium salt of the chromium complex of the compound of the formula

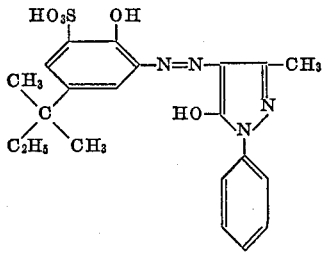

with the basic dyestuffs of the formula

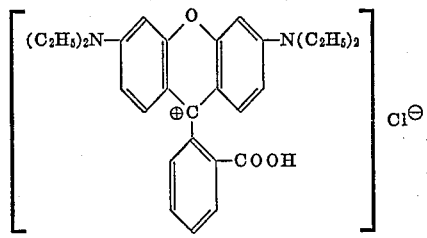

are dissolved in 1000 g. of a mixture of solvents consisting of 50 percent by weight of trichloroethylene and 50 percent by weight of ethanol. The blueish red solution is clarified and cellulose-2½-acetate fabric is impregnated therewith as described in Example 1. Drying of the fabric and thermofixing are performed as given in the previous example.

A level blueish red dyeing on the material mentioned is obtained.

Similar results are obtained on cellulose triacetate in an analogous process.

If in this example, instead of the colour salt given, the corresponding amount of precipitation product of the same basic dyestuff with the 1:2 cobalt complex of 2-amino - 1 - hydroxy-benzene-4-sulphonic acid amide→1-phenyl-3-methyl pyrazolone is used and otherwise the procedure given in the example is followed, then scarlet dyeings having the same properties are obtained.

Dyeings on cellulose-2½-acetate fabric of improved uniformity of fastness to crocking and practically unimpaired fastness to perspiration are obtained by repeating Examples 1 to 37, but adding to the dye liquor in each example 1% by weight, calculated on the total weight of the dye liquor in each example, of the condensation product of oleic acid and ethylene oxide in a molar ratio of about 1:7.5.

EXAMPLE 38

5 g. of the dyestuff of the formula

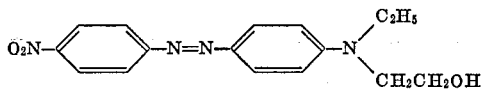

are dissolved in 995 g. of a mixture of solvents which consists of 955 g. of tetrachloroethylene, 30 g. of dimethyl acetamide and 10 g. of condensation product of oleic acid and ethylene oxide (molar ratio about 1:7.5). The intensively red coloured dye solution is first clarified. Then cellulose-2½-acetate fabric is impregnated therewith at room temperature, excess dye liquor is squeezed out to 100% of the dry weight of the goods and the impregnated fabric is dried in a 40–80° hot airstream. The fabric is then thermofixed for 100 seconds with an apparatus for infrared irradiation at 190°–210°.

A strongly coloured, level and well developed red dyeing is obtained which has good fastness to dry cleaning, good fastness to perspiration and even, excellent fastness to rubbing.

The above-mentioned red-colored dye-solution can also be prepared from 95 g. of a pre-concentrate consisting of 5 g. of the aforesaid dyestuff (ca. 5.2%)
50 g. of tetrachloroethylene (ca. 52.7%)
30 g. of dimethyl acetamide (ca. 31.6%) and
10 g. of the aforesaid condensation product (ca. 10.5%), by diluting the said pre-concentrate with 905 g. of tetrachloroethylene.

Equally satisfactory dyeings having a slightly improved handle are obtained by steaming the goods with saturated steam at 100° for 20 minutes instead of thermofixing.

Also goods which have had an intermediate drying in the air after squeezing out can be steamed with equally good results.

If in this example, instead of the 30 g. of dimethyl acetamide, one of the water miscible solvents given in column 2 of the following Table V is used in the amount given in column 3, and otherwise the procedure given in the example is followed, then level and well developed scarlet dyeings are obtained on cellulose - 2½ - acetate fabric. The dyeings have similarly good fastness properties.

TABLE V

| Example No. | Water miscible solvent | Amount (g.) |
| --- | --- | --- |
| 39 | Ethanol | 100 |
| 40 | Benzyl alcohol | 100 |
| 41 | n-Butanol | 80 |
| 42 | Ethylene glycol monomethyl ether | 90 |
| 43 | Tetrahydrofurfuryl alcohol | 90 |
| 44 | Ethylene glycol | 50 |
| 45 | 1,2-propylene glycol | 60 |
| 46 | Dioxan | 100 |
| 47 | Acetone | 100 |
| 48 | Dimethyl formamide | 30 |
| 49 | Pyridine | 50 |

If in Examples 38 to 49, instead of 955 g. of tetrachloroethylene, the same amount of one of the hydrocarbons or chlorinated hydrocarbons given in column 2 of the following Table VI is used and otherwise the same procedure as given in Example 38 is followed, then level and well developed red dyeings are also obtained on cellulose-2½-acetate fabric.

TABLE VI

| Example No.: | Hydrocarbon or chlorinated hydrocarbon |
| --- | --- |
| 50 | Toluene. |
| 51 | Xylene. |
| 52 | Trichloroethylene. |
| 53 | Carbon tetrachloride. |

If in Examples 38 to 53 cellulose triacetate is used instead of cellulose-2½-acetate then, with otherwise the same procedure as described, well developed and strongly coloured red dyeings are also obtained on this material.

EXAMPLE 54

10 g. of the dystuff of the formula

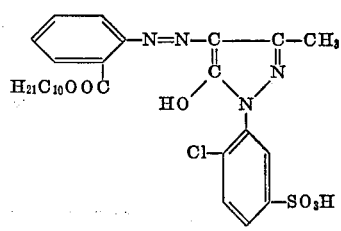

are dissolved in 1000 g. of a mixture of solvents which consists of 950 parts by weight of tetrachloroethylene, 30 parts by weight of dimethyl acetamide and 10 parts by weight of the polyether used in Example 38, and the solution is clarified. Cellulose-2½-acetate fabric is impregnated with the clear, yellow dye solution obtained and then dried as described in Example 38. The impregnated and dried fabric is then thermofixed in a 190° hot air stream for 120 seconds or, while still moist, it is steamed for 20 minutes with slightly superheated steam at 102°.

A strongly coloured, level and well developed yellow dyeing is obtained which has good fastness to rubbing, washing and perspiration on the material mentioned.

Equally satisfactory yellow dyeings having similar good fastness properties are obtained when the above Example 54 is repeated using 5 g. of the dyestuff of the formula

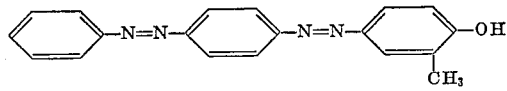

instead of 10 g. of the dyestuff mentioned, in 1000 g. of dye liquor.

If in Example 54, instead of 30 parts by weight of dimethyl acetamide, one of the water miscible solvents given in column 2 of the above Table V is used in the amounts given in column 3 of the same table and otherwise the procedure described in Example 54 is followed, then level and well developed yellow dyeings on cellulose-2½-acetate fabric having similarly good fastness properties are also obtained.

If in Example 54, instead of 950 parts by weight of tetrachloroethylene, the same amount of one of the hydrocarbons or chlorinated hydrocarbons given in the above Table VI is used and otherwise the procedure given in Example 54 is followed, then level and well developed yellow dyeings on cellulose-2½-acetate and also on cellulose triacetate fabric are also obtained.

EXAMPLE 55

10 g. of the dyestuff of the formula

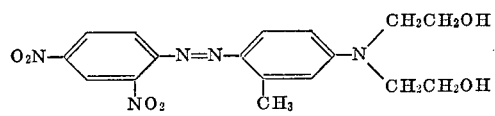

are dissolved at room temperature in 1000 g. of a mixture of solvents which consists of 960 g. of tetrachloroethylene, 30 g. of dimethyl acetamide and 10 g. of a condensation product of oleic acid and ethylene oxide (molecular ratio about 1:7.5). With the resulting violet coloured dyestuff solution cellulose-2½-acetate fabric is impregnated, excess dye liquor is squeezed out to 100% of the dry weight of the goods and the impregnated fabric is dried in a 40–80° hot airstream. The dyeing is then thermofixed for 120 seconds in a hot airstream at 190°.

A violet level dyeing is obtained which has good fastness to rubbing, perspiration and dry cleaning.

Equally strong and level dyeings having similarly good properties are obtained, if, instead of the dyestuff given above, one of the dyestuffs given in column 2 of the following Table VII is used and otherwise the procedure given in the example is followed. The shades of the resulting dyeings on cellulose-2½-acetate fabric are indicated in the last column of said table.

TABLE VII

| Example No. | Dyestuff | Shade on cellulose-2½-acetate |
|---|---|---|
| 56 | ⟨phenyl⟩—NH—COOCH₂CH₃ ... N(C₂H₅)— ⟨phenyl-CH₃⟩ —CH=C(CN)₂ | Greenish yellow. |
| 57 | O₂N—⟨phenyl⟩—N=N—C—CH₃ with H₂N—, N, phenyl ring | Yellowish orange. |
| 58 | O₂N—⟨phenyl⟩—N=N—⟨phenyl(NH—COCH₃)⟩—N(CH₂CH₂OCOCH₃)₂ | Scarlet. |
| 59 | Anthraquinone with NHCH(CH₃)₂ and NH—⟨phenyl-OSO₂CH₃⟩ | Blue. |
| 60 | Anthraquinone with NH₂, SO₃H, and NH—⟨phenyl(CH₃)₃-NH—COCH₂Cl⟩ | Blue. |

EXAMPLE 61

5 g. of the dyestuff having the formula

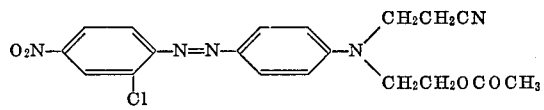

are dissolved in 1000 g. of a mixture of solvents which consists of 960 g. of tetrachloroethylene, 30 g. of dimethyl acetamide and 10 g. of a condensation product of stearyl alcohol and ethylene oxide (molecular ratio 1:5) and the solution is clarified. Cellulose-2½-acetate fabric is impregnated at room temperature with the resulting filtrate. Excess dye liquor is squeezed out to about 80% of the dry weight of the goods and the impregnated fabric is dried at 40–50° and then thermofixed for 90 seconds in a hot airstream at 200°.

A strongly coloured, level orange dyeing is obtained which has good fastness to rubbing.

If, in the above example the 10 g. of the condensation product of stearyl alcohol and ethylene oxide (molecular ratio 1:5) are replaced by one of the following components and otherwise the procedure given in the example is followed, then orange dyeings having similarly good properties are obtained:

(a) 10 g. of a condensation product of stearyl alcohol and ethylene oxide (molecular ratio 1:10), (b) 20 g. of a condensation product of oleyl alcohol and ethylene oxide (molecular ratio 1:5), (c) 5 g. of a condensation product of oleyl alcohol and ethylene oxide (molecular ratio 1:10).

(d) 10 g. of a condensation product of lorol and ethylene oxide (molecular ratio 1:5), (e) 10 g. of a condensation product of lorol and ethylene oxide (molecular ratio 1:10), (f) 10 g. of a condensation product of p-nonylphenol and ethylene oxide (molecular ratio of 1:9), (g) 10 g. of a condensation product of oleic acid and ethylene oxide (molecular ratio 1:10), or (h) 10 g. of a condensation product of stearic acid and ethylene oxide (molecular ratio 1:7).

EXAMPLE 62

10 g. of the colour salt having the formula

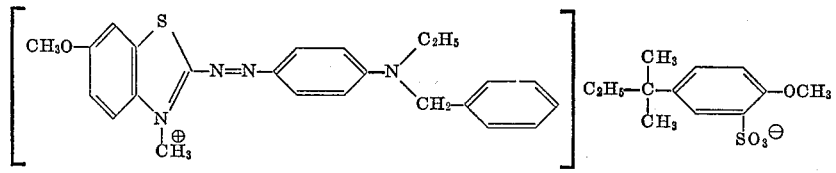

are dissolved in 1000 g. of a mixture of solvents which consists of 890 g. of trichloroethylene, 100 g. of methyl alcohol and 10 g. of a condensation product of oleic acid and ethylene oxide (molecular ratio 1:7.5). With the obtained clear blue dyestuff solution cellulose-2½-acetate fabric is impregnated, excess dye liquor squeezed out to about 80% of the dry weight of the goods and the impregnated fabric is dried in a 60–80° hot airstream. Then the dyeing is thermofixed for 100 seconds with an apparatus for infrared irradiation at 190–210°.

A strongly coloured, level blue dyeing is obtained which has good fastness to dry cleaning and excellent fastness to rubbing.

EXAMPLE 63

10 g. of the colour salt obtained by precipitation of an aqueous solution of the sodium salt of the 2:1 chromium complex compound having the formula.

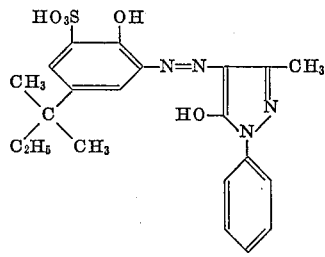

with the basic dyestuff having the formula

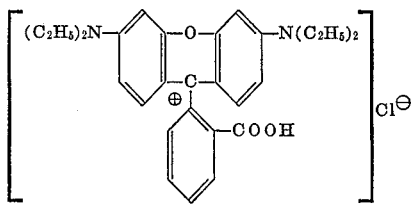

are dissolved in 1000 g. of a mixture of solvents which consists of 960 g. of tetrachloroethylene, 30 g. of dimethyl acetamide and 10 g. of a condensation product of oleic acid and ethylene oxide (molecular ratio 1:7.5). With the clarified dyestuff solution cellulose-2½-acetate fabric is impregnated, excess dye liquor is squeezed out and the goods are dried in a 60° hot airstream. Then the dyeing is thermofixed for 120 seconds in a hot airstream at 190–210°.

A level blueish red dyeing is obtained which has good fastness to rubbing.

We claim:

1. A process for the continuous coloring of cellulose ester fiber material, comprising:

(I) applying to a cellulose ester fiber material a nonaqueous dyestuff solution comprising a mixture consisting essentially of (a) 50–99.5 percent by weight of unhalogenated or halogenated hydrocarbon having a boiling point between 70 and 150° C., (b) 50–0.5 percent by weight of water-miscible organic solvent having a boiling point below 210° C., (c) at least 0.1 percent by weight, calculated on the total weight of the dye liquor, of a noninorganic polyether which improves crocking, and (d) a dyestuff, of which dyestuff at least 0.5 gram is soluble in every kilogram of cellulose ester fibers, in a sufficient amount to impart to said material a desired color depth; and (II) fixing the resulting dyeing on said fiber, thereby obtaining a product having a silk-like handle.

2. A process as described in claim 1, wherein said component (c) is a polyglycol ether consisting of a higher aliphatic hydrocarbon radical as lipophilic moiety and a chain of about 4 to 20 ethyleneoxy groups.

3. A process as described in claim 2, wherein said higher aliphatic hydrocarbon radical is that of a fatty alcohol or fatty acid of from 12 to 18 carbon atoms.

4. A process as described in claim 2, wherein said higher aliphatic acid radical is that of an unsaturated fatty acid of from 12 to 18 carbon atoms and said chain consists of from 4 to 10 ethyleneoxy groups.

5. A process as described in claim 1, wherein said component (c) is an oleoyl polyglycol ether having from 4 to 10 ethyleneoxy groups.

6. A process as described in claim 1, wherein said component (a) is a chlorinated lower aliphatic hydrocarbon.

7. A process as described in claim 1, wherein said component (a) is tetrachloroethylene or trichloroethylene.

8. A process as described in claim 1, wherein said component (b) is an amide of a lower fatty acid.

9. A process as described in claim 1, wherein said component (b) is dimethyl acetamide.

10. A process as described in claim 1, wherein said mixture contains about 3 to 5 percent by weight, calculated on the total weight of the dye liquor, of component (b), and said dyestuff solution contains about 0.5 to 3 percent by weight, calculated on the total weight thereof, of component (c).

11. A process as described in claim 1, wherein said dyestuff is a dispersion dyestuff free from water-solubilizing groups which dissociate acid in water.

12. A process as described in claim 11, wherein said dispersion dyestuff is a metal-free azo dyestuff.

13. A process as described in claim 11, wherein said dispersion dyestuff is a styryl dyestuff.

14. A process as described in claim 11, wherein said dispersion dyestuff is a naphthoperinone disperse dyestuff.

15. A process as described in claim 11, wherein said dispersion dyestuff is a quinophthalone disperse dyestuff.

16. A process as described in claim 11, wherein said dispersion dyestuff is a nitro disperse dyestuff.

17. A process as described in claim 11, wherein said dispersion dyestuff is an anthraquinone disperse dyestuff.

18. A process as described in claim 1, wherein said dyestuff is an acid wool dyestuff which contains a sulfonic acid or carboxylic acid group and is an azo or an anthraquinone dyestuff.

19. A process as described in claim 1 wherein said dyestuff is a chromium- or cobalt-containing monoazo dyestuff containing no acid and basic water-solubilizing groups, which dyestuff contains one metal atom bound to two molecules of monoazo dyestuff.

20. A process as described in claim 1, wherein said dyestuff is a color salt which contains an organic cation and an organic anion.

21. A process as described in claim 1, wherein, in step (I), said cellulose ester fiber material is impregnated with said non-aqueous dyestuff solution.

22. A process as described in claim 21, wherein said dyeing is fixed by heat treating the impregnated fiber material in dry air at a temperature of from at least 185° C. to a temperature below the softening point of the fiber material.

23. A process as described in claim 1, wherein said fiber material consists essentially of cellulose 2½-acetate fibers.

24. A process as described in claim 1, wherein said fiber material consists essentially of cellulose triacetate fibers.

25. A dye liquor concentrate consisting essentially of a solution of
(i) from about 30° to 80° of unhalogenated or halogenated hydrogen having a boiling point between 70 and 150° C.,
(ii) correspondingly, from about 65 to 8% of water-miscible organic solvent having a boiling point below 210° C.,
(iii) from about 5 to 30% of non-ionogenic polyether which improves crocking, and
(iv) a dyestuff, at least 0.5 gram of which dyestuff is soluble in one kilogram of cellulose ester fiber, said concentrate being dilutable with hydrocarbon as defined under (i) to a substantially clear dye solution.

26. A dye liquor concentrate consisting essentially of a solution of
(i) from about 30% to 80% of a hydrocarbon from the class consisting of toluene, xylene, chlorobenzene, carbon tetrachloride, trichloroethylene, tetrachloroethylene, tetrachloroethane and dibromo-ethylene,
(ii) correspondingly, from about 65% to 8% of a water-miscible organic solvent from the class consisting of lower alkanol, lower alkylene glycol mono-lower alkyl ether, furfuryl, tetrahydrofurfuryl alcohol, lower alkanediol, lower aliphatic ketone, dioxan, lower fatty acid lower alkylamide, lower alkyl-substituted urea and pyridine,
(iii) from about 5 to 30% of a condensation product consisting of (a) a lipophilic moiety of from 10 to 20 carbon atoms, from the class consisting of a higher fatty alcohol moiety and a higher fatty acid moiety, and of (b) an ether moiety of from 4 to 20 ethyleneoxy groups,
said condensation product being miscible with at least one of the components defined under (i) and (ii), respectively, and
(iv) a dyestuff, at least 0.5 gram of which dyestuff is soluble in one kilogram of cellulose ester fiber, said concentrate being dilutable with hydrocarbon as defined under (i) to a substantially clear dye solution.

27. A dye liquor concentrate as defined in claim 26, wherein said hydrocarbon defined under (i) is trichloroethylene or tetrachloroethylene; said water-miscible organic solvent defined under (ii) is a lower fatty acid lower alkyl amide; and said condensation product defined under (iii) consists of a higher unsaturated fatty acid moiety of from 10 to 20 carbon atoms, and an ether moiety of from 4 to 20 ethyleneoxy groups.

28. A dye liquor concentrate as defined in claim 27, wherein said hydrocarbon is trichloroethylene.

29. A dye liquor concentrate as defined in claim 27, wherein said hydrocarbon is tetrachloroethylene.

30. A dye liquor concentrate as defined in claim 27, wherein said water-miscible organic solvent is dimethyl acetamide.

31. A dye liquor concentrate as defined in claim 27, wherein said water-miscible organic solvent is dimethyl formamide.

32. A dye liquor concentrate as defined in claim 27, wherein said condensation product consists of an oleoyl moiety and an ether moiety of from 4 to 10 ethyleneoxy groups.

33. Cellulose ester fiber material colored by the process described in claim 1, said fiber material being thereby rendered uniformly fast to crocking.

34. Cellulose ester fiber material as defined in claim 33, wherein the fibers are cellulose-2½-acetate fibers.

35. Cellulose ester fiber material as defined in claim 33, wherein the fibers are cellulose triacetate fibers.

References Cited

UNITED STATES PATENTS

| 2,274,751 | 3/1942 | Sowter et al. | 8—59 |
| 2,344,973 | 3/1944 | Croft et al. | 8—59 |
| 3,342,804 | 9/1967 | Mueller | 8—50 |
| 2,274,751 | 3/1942 | Sowter et al. | 8—59 |
| 2,344,973 | 3/1944 | Croft et al. | 8—59 |

(Other references on following page)

FOREIGN PATENTS 59,804   7/1947   Netherlands.

OTHER REFERENCES

J. Boulton: Dyeing of Cellulose Triacetate, Soc. Dyers & Colours, 71(8), August 1955, pp. 451, 454–56, 459–60.

Du Pont Product Information, Dimethyl Formamide, available Nov. 28, 1949, C&E News, pp. 1, 4, 5.

H. Robinette: Am. Dyest. Rep., 39:23, pp. 888–890, Dec. 11, 1950.

NORMAN G. TORCHIN, Primary Examiner

J. E. CALLAGHAN, Assistant Examiner

U.S. Cl. X.R.

8—93

UNITED STATES PATENT OFFICE
CERTIFICATE OF CORRECTION

Patent No. 3,524,718        Dated August 18, 1970

Inventor(s) JOZSEF NADOR ET AL.

It is certified that error appears in the above-identified patent and that said Letters Patent are hereby corrected as shown below:

Col. 1, immediately following line 10, insert the following --claims priority application in Switzerland, March 9, 1966, 3375/66--.

Col. 18, line 68, change "inorganic" to --ionogenic--.

Signed and sealed this 11th day of January 1972.

(SEAL)
Attest:

EDWARD M. FLETCHER, JR.
Attesting Officer

ROBERT GOTTSCHALK
Acting Commissioner of Patents